United States Patent [19]
Hashimoto

[11] Patent Number: 6,141,772
[45] Date of Patent: Oct. 31, 2000

[54] OPTICAL DISC RECORDING APPARATUS

[75] Inventor: Hirokuni Hashimoto, Kanagawa-ken, Japan

[73] Assignee: Ricoh Company, Ltd., Tokyo, Japan

[21] Appl. No.: 09/076,485

[22] Filed: May 13, 1998

[30] Foreign Application Priority Data

May 14, 1997 [JP] Japan .................................. 9-123661

[51] Int. Cl.[7] ................................................ G06F 11/10
[52] U.S. Cl. .............................................. 714/16; 369/54
[58] Field of Search .................................. 714/16, 1, 2, 3, 714/5, 6, 7, 11, 13, 20, 25, 35, 41, 42, 43, 44, 48, 770, 771; 711/114, 133; 369/53–55, 59, 58, 32

[56] References Cited

U.S. PATENT DOCUMENTS

| | | | |
|---|---|---|---|
| 4,525,839 | 7/1985 | Nozawa et al. | 371/38 |
| 4,638,472 | 1/1987 | Ogata et al. | 369/54 |
| 4,774,700 | 9/1988 | Satoh et al. | 369/54 |
| 4,885,735 | 12/1989 | Fukushima et al. | 369/58 |
| 4,986,668 | 1/1991 | Fukushima et al. | 369/59 |
| 5,111,444 | 5/1992 | Fukushima et al. | 369/58 |
| 5,293,566 | 3/1994 | Satoh et al. | 369/49 |
| 5,408,478 | 4/1995 | Ohmori et al. | 371/37.5 |
| 5,559,778 | 9/1996 | Inokuchi et al. | 369/58 |
| 5,568,608 | 10/1996 | Shannon | 395/183.2 |
| 5,623,470 | 4/1997 | Asthana et al. | 369/58 |
| 5,666,338 | 9/1997 | Ishizawa et al. | 369/48 |
| 5,715,424 | 2/1998 | Jesionowski et al. | 395/440 |
| 5,777,307 | 7/1998 | Yamazaki | 235/454 |
| 5,896,351 | 4/1999 | Misaizu et al. | 369/32 |
| 5,986,980 | 11/1999 | Takeshita et al. | 369/32 |

FOREIGN PATENT DOCUMENTS 7-235133  9/1995  Japan .

*Primary Examiner*—Nadeem Iqbal
*Attorney, Agent, or Firm*—Dickstein Shapiro Morin & Oshinsky LLP

[57] ABSTRACT

An optical disc recording apparatus forms a plurality of tracks on the recording area of an erasable optical disc, divides each of the plurality of tracks into a plurality of packets, records data onto the packets and also has a rewriting means for rewriting data onto the plurality of packets if a recording error occurs during recording of the data. The optical disc recording apparatus allows efficient use of the recording area of an erasable optical disc.

16 Claims, 5 Drawing Sheets

OPTICAL DISC RECORDING APPARATUS

BACKGROUND OF THE INVENTION

1. Field of the Invention

The present invention relates to an optical disc recording apparatus which records and reproduces information to and from an erasable optical disc, such as a CD-R media or a CD-RW media.

2. Description of the Related Art

The minimum reproducible unit of data that can be recorded onto the recording area of a read only optical disc (e.g. CD), a recording optical disc (e.g. CD-R), or an erasable optical disc (e.g. CD-RW) is called a "BLOCK". Each block is made up of between 2048 bytes and 2352 bytes of data. The minimum recording unit of data for an optical disc (e.g. CD-R, CD-RW) is called a "packet". The packet comprises at least one user data block to reproduce data, five linking blocks (one link block and four Run-In blocks) before the user data block and two linking blocks (two Run-Out blocks) behind the user data block. The linking blocks are necessary to link the packets to each other when recording data on the optical disc, and do not include any user data.

The recording format of a CD-R or CD-RW optical disc is prescribed in the Orange Book, an industry standard. The Orange Book rules dictate that data sectors which are not consecutively written require lengthy lead-in and lead-out sectors such as Link, Run-In, and Run-Out sectors. These sectors are necessary to enable optical disc drives to synchronize to the data on the optical media. This is because the laser beam must be repositioned each time a new writing session is started, and known optical disc drive positional controls are not sufficiently accurate to position a laser beam at the exact end point of previously written data.

There are at least two methods to record data onto a CD-R or CD-RW disc, the Track-at-Once method and the Packet Write Method. The Track-at-Once method records one track with one packet. The user data blocks in the track are recorded sequentially and thus, there are no linking blocks between the user data blocks. The Track-at-Once method is capable of recording a maximum of 99 tracks on the optical disc. In the Track-at-Once method, the start address and end address are recorded in a different area as a Table Of Contents (TOC). In other words, in the Track-at Once method, the optical disc drive must write the entire disc or track in a single writing session.

The Packet Write Method, on the other hand, divides the track into a plurality of packets and records data by packet unit. The user data in one track exists independently and is separated from other user data blocks by linking blocks. There are two different ways to record on an optical disc using the Packet Write Method, a fixed length Packet Write Method and a variable length Packet Write Method. The fixed length Packet Write Method records material by fixing the size of the packet by limiting the number of user data blocks of the user data in the packet. Thus, the packet length or packet size in the track is a predetermined size. The variable length Packet Write Method records material with a variable packet length in the track.

When using the Packet Write Method, a physical address is assigned to each block in the optical disc with the first physical address corresponding to zero. When accessing the physical address, it is possible to access the physical address indirectly by converting the logical address to the physical address.

In the variable length Packet Write Method, the physical address and the logical address are linearly related with a logical address being assigned for each user data block. In the variable length Packet Write Method, a logical address is also assigned to each linking block which can not be accessed. Therefore, a logical address exists in the variable length Packet Write Method that can not be accessed.

In the fixed length Packet Write Method, a logical address is assigned only to the user data blocks. The first user data block of the track corresponds to a logical address. The first logical address is assigned to the user data block corresponding to the first user data block and the logical address skips the linking block. The next logical address is assigned to the second user data block. Accordingly, in the fixed length Packet Write Method the logical address is continuous and the information recorded on the optical disc can be reproduced without knowledge of the contents of the packet.

However, all packet write methods require that the minimum recording unit of data be recorded at once. Thus, it is impossible to divide up the data contained in one packet and write that data contained in the one packet in many consecutive recordings. If one divides the data, it is necessary to add a linking block to the user data blocks in accordance with the linking rules. In this situation, the data is thus no longer one packet but a plurality of packets that must have linking blocks between the user data blocks. Otherwise the data without the linking blocks will not be able to be reproduced.

Data is not always recorded successively to previously recorded data on the optical disc. For example, if dust obscures the data recording portion of an optical disc, or a vibration is produced during the recording of the data, the data recording for the optical disc may fail, causing a recording error. If a data error occurs, the data recorded on the packet can not be reproduced; however, the data may be rewritten on the disc.

A conventional optical disc recording apparatus is shown in Japanese unexamined patent publication (KOKAI) No 7-235133. The recording apparatus records data onto a write-once optical disc to enable the previous recording to be read if the previous recording was incomplete. The conventional optical disc recording apparatus also enables additional data to be recorded onto the write-once optical disc following the incomplete recording.

However, in the conventional optical disc recording apparatus, it is impossible to reproduce the data from a packet which was not recorded onto the optical disc (e.g. CD-R). The portions of data that were not recorded are unable to be reproduced, causing the loss of the data.

If the recording data failed to be record again, it is necessary to record the data to another packet, including the changes to the address of the packet that recorded the data and the change of the location description.

SUMMARY OF THE INVENTION

It is therefore an object of the present invention to provide an optical disc apparatus which can record the data to make use of the areas which were previously unable to be reproduced by the Packet Write Method of recording for an erasable optical disc. The invention is not intended to be limited by the particular process described below.

In accordance with first embodiment of the present invention, an optical disc apparatus is provided using the Packet Write Method which forms a plurality of tracks on the recording area of an erasable optical disc, divides each track into a plurality of packets and records data onto each packet in one lot. The optical disc apparatus also includes a rewriting means for rewriting data onto the same packet should a recording error occur.

In accordance with second embodiment of the present invention, an optical disc apparatus is provided using the Packet Write Method, which forms a plurality of tracks on the recording area of an erasable optical disc, divides each track into a plurality of packets and records data on each packet in one lot. The optical disc apparatus also includes a rewriting means for receiving data from a host computer, which is connected externally to the optical disc apparatus, and holding the data in a buffer. When a recording error occurs during the recording of the data, the data is rewritten to the original packet using the data stored in the buffer.

In accordance with third embodiment of the present invention, an optical disc apparatus is provided which uses the Packet Write Method, forms a plurality of tracks on the recording area of an erasable optical disc, divides each track into a plurality of packets and records the data on each packet in one lot. The optical disc apparatus also includes a rewriting means for successively rewriting data onto the original packet together with the rewriting of the data for subsequent packets when a recording error is produced during the successive recording of data on the plurality of packets on the track.

In the above first embodiment of the invention, the Packet Write Method forms a plurality of tracks in the recording area of an erasable optical disc, divides each track into a plurality of packets and records the data by packet unit once. If a recording error occurs during the recording of data onto the packet of the track, the data is rewritten onto the same packet which caused the recording error. Therefore, it is possible to record the data on the packet without adding additional link portions to indicate the new location of the data, thereby reducing the size of the recorded data. It is also possible to record the data in the recording area of the optical disc by the Packet Write Method so as not to access an area of the recording medium where it would be impossible to reproduce the data, thus making a more effective use of the recording area. Since it is possible to record the data on the packet to record from the first packet, it is unnecessary to readdress the rewritten data.

In the above second embodiment of the present invention, the Packet Write Method forms a plurality of tracks in the recording area of an erasable optical disc, divides each track into a plurality of packets and records the data by packet unit once. The optical disc apparatus receives and holds the data from a host computer in a buffer. When a recording error occurs during the recording of the data held in the buffer, the optical disc apparatus rewrites the data onto the packet which caused the recording error using the data stored in the buffer. Therefore, it is possible to rewrite the data on the packet without sending the data from the host computer for every rewriting, and it is also unnecessary to provide a special operating function to send the data to the host computer again.

Additionally, it is possible to record the data without adding additional link portions to the packet while remaining able to reproduce the recorded data. Accordingly, it is possible to record the data in the recording area of the optical disc by the Packet Write Method so as not to use the area of the recording medium where is would be impossible to reproduce the data, thus more effectively using the recording area. Since it is possible with the present invention to rerecord data subject to a recording error to the packet where it was originally intended, it is unnecessary to readdress the data.

In the above third embodiment of the present invention, the Packet Write Method forms a plurality of tracks in the recording area of an erasable optical disc, divides each track into a plurality of packets and records the data on every packet once. When a recording error is producing during the successive recording of data onto the plurality of packets of the track, the optical disc apparatus rewrites the data from the first packet onto original packet and also rewrites the data recorded in the subsequent packets. It is therefore possible to prevent the apparatus from causing new recording errors caused by the rewriting of the data from the error packet onto subsequent packets.

It is possible to record the data without additional link portions in the packet, and to reproduce the recorded data. Accordingly, the data in the recording area of an optical disc by the Packet Write Method may be organized so as not to use the area of the recording medium where it would be impossible to reproduce the data. Since it is possible to rerecord the data on the packet to its original place, it is unnecessary to readdress the data.

DESCRIPTION OF THE PREFERRED EMBODIMENTS

The preferred embodiments of the optical disc recording apparatus according to the present invention will next be described in detail with reference to the accompanying figures.

The optical disc recording apparatus may be any apparatus which records informational signals by forming an arrangement of pits on the erasable optical disc (e.g. CD-RW). Typically, the pits are formed in a spiral on the optical recording medium. The optical disc recording apparatus reads the information in units of "blocks" from the pits formed in the recording medium. The present apparatus uses the Packet Write Method to record data by packet unit onto the recording area by recording a plurality of recording portions called packets, where the packets have linking blocks added before and after the user data block.

Figure 2:
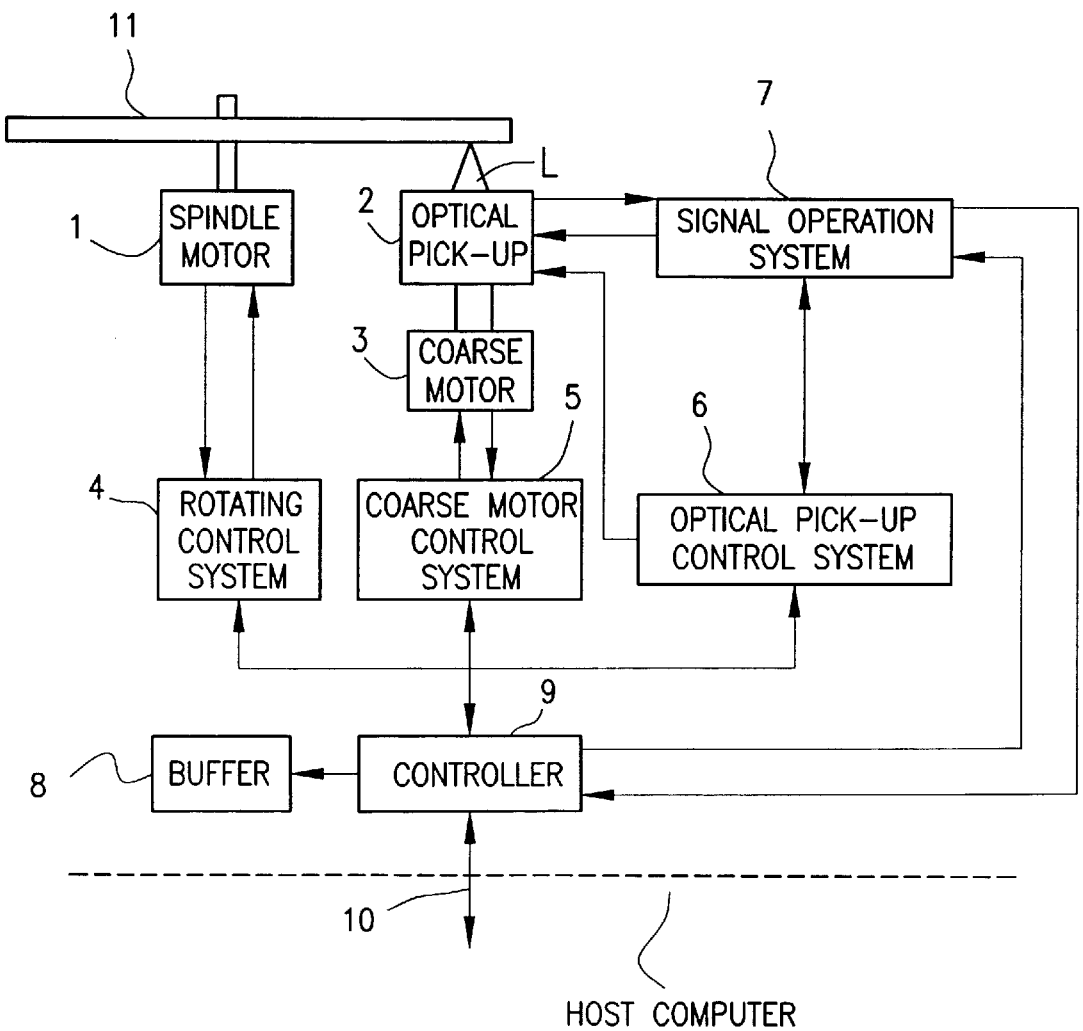
FIG. 2 is a block view showing the structure of the optical disc apparatus in accordance with one embodiment of the present invention.

FIG. 2 is a block view showing the structure of the optical disc recording apparatus in accordance with one embodiment of the present invention. As shown in FIG. 2, the optical disc recording apparatus has a spindle motor 1 which rotates an optical disc 11, for example a CD-RW. The spindle motor 1 is controlled so as to keep a constant linear velocity by the course motor driver 3. The linear velocity can be changed stepwise. The optical pick-up 2 includes a semiconductor laser, an optical arrangement, a focus actuator, a photo detector, and a position sensor. The optical pick-up 2 radiates laser rays L onto the recording surface of the optical disc 11. The coarse motor 3, together with a seek motor (not shown), moves the optical pick up 2 in a radial direction relative to the optical disc 11.

The optical disc recording apparatus has a rotating control system 4 for controlling the rotation of the spindle motor 1, a coarse motor control system 5 for controlling the drive of the coarse motor 3, an optical pick up control system 6 for controlling the optical pick up 2 and a signal operating system 7 for sending and receiving the data signal which is reproduced by the optical pick up 2 and written onto the recording area of the optical disc 11.

The optical disc apparatus has a buffer 8 for holding data reproduced from the optical disc and data received from the host computer. The buffer is further discussed with reference to FIG. 3. The optical disc apparatus further includes a controller 9 for controlling the above control systems 4–6 and the signal operating system 7. The optical disc system also includes an external interface 10 for connecting the optical disc apparatus to a host computer.

The optical disc apparatus moves the optical pick-up 2 in a radial direction relative to the optical disc 11 while the optical disc 11 is being rotated by the spindle motor 1. Data is recorded and reproduced to and from the optical disc 11 by radiating the laser ray L from the laser diode of the optical pick-up 2.

Figure 3:
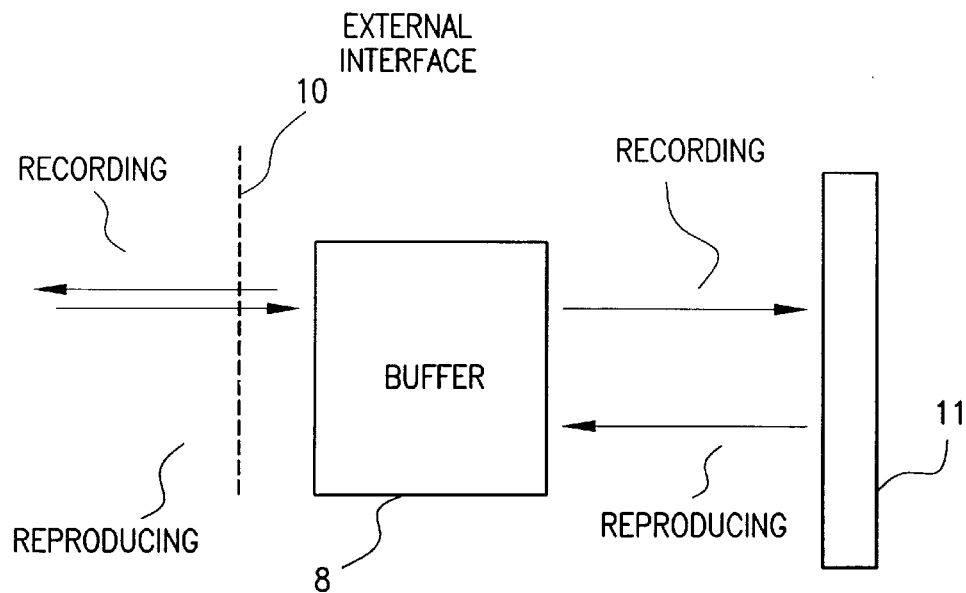
FIG. 3 is shows the buffer of the optical disc apparatus referred to in FIG. 2.

Reference is now made to FIG. 3. This figure shows the buffer 8 of the optical disc apparatus referred to in FIG. 2. When the optical disc recording apparatus reproduces data, the controller 9 moves the optical pick-up 2 in a radial direction with respect to the optical disc 11, while the optical disc 11 is rotated by the spindle motor 1. The optical disc apparatus radiates the laser ray L onto the recording area of the optical disc 11 through the optical pick-up 2 and reproduces the data recorded on the recording area of the optical disc 11 based on the reflective light of the recording area. After temporarily storing the reproduced data in the buffer 8, the optical disc recording apparatus sends the data to the host computer through the external interface 10.

When recording data, the controller 9 stores the data received through the external interface into the buffer 8. Energy is radiated by the laser ray L onto the recording area of the optical disc 11 through the optical pick-up 2 to record the data from the buffer 8 using the Packet Write Method. If a recording error occurs during the recording of the data, the controller 9 directs the optical disc recording apparatus to rewrite the data onto the recording area of the optical disc 11.

Specifically, the controller 9 directs the apparatus to form a plurality of tracks on the recording area of an erasable optical disc 11, divides each track into a plurality of packets and records information onto the disc using the Packet Write Method which records the data onto the recording area all at once using packets. When an recording error occurs during the recording of the data onto the track, the controller 9 directs the apparatus to rewrite the non-recorded data onto the packet where the recording error occurred.

Furthermore, data may be received from a host computer which can be connected to the optical disc recording apparatus by the external interface 10 and stored in the optical disc recording apparatus. When a recording error occurs during recording of data that was held in the buffer 8, the data stored in the buffer 8 is rewritten onto the packet where the recording error occurred.

When the recording error occurs during successively recording of the data on the packets in the track, the optical disc recording apparatus rewrites the data on the first packet where the recording error occurred and also rewrites the data to the packets subsequent to the packet where the recording error occurred.

The Packet Write Method will now be explained with reference to FIGS. 2 and 4. The Packet Write Method includes two different types of recording methods, the fixed length Packet Write Method and variable length Packet Write Method. The fixed length Packet Write Method includes forming a plurality of tracks on the recording area of an erasable optical disc, dividing each track into a plurality of packets, fixing the user block number of each packet in one track at the same time and recording the information by packet. On the other hand, the variable length Packet Write Method records a variable length packet in the track.

Figure 4:
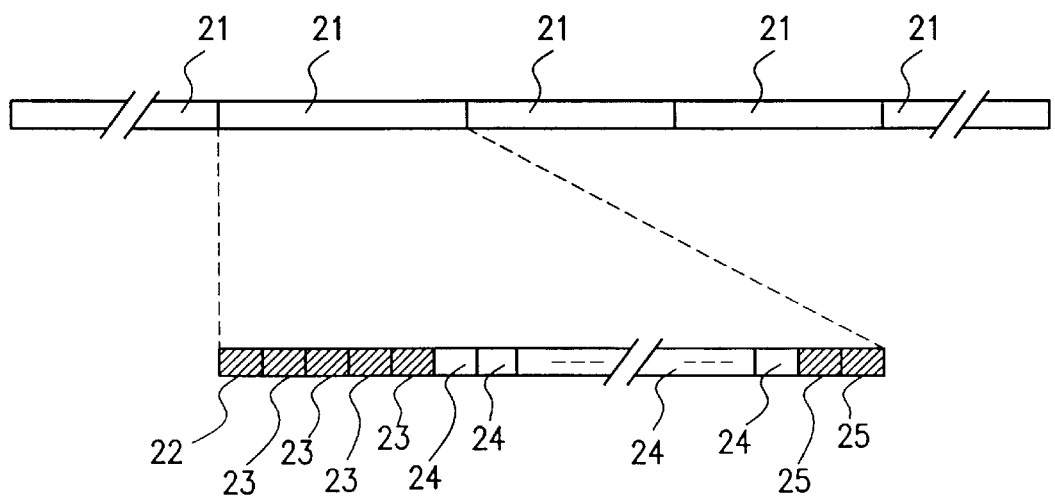
FIG. 4 is shows the track of the Packet Write Method and format of the packet.

In the fixed length Packet Write Method, the recording area of the optical disc 11 has the same length packets 21 in each track as shown FIG. 4 and the user data block 24 in each packet 21 are of equal size. In the variable length Packet Write Method, the packet 21 contains the five linking blocks but may contain a variable number of user data blocks 24, as shown in FIG. 4.

The packet 21 includes at least one user data block 24 to reproduce data. The packet 21 also includes five linking blocks. One linking block 22 is provided before the user data block and four run-in blocks 23 and two linking blocks comprising the two run-out blocks 25 are provided behind the user data block 24.

The linking block is a necessary component of the packet 21 to allow the packets 21 to be linked to each other. Data is stored onto the optical disc 11 by the packet 21 including the user data blocks 24 which actually store the data.

Figure 5:
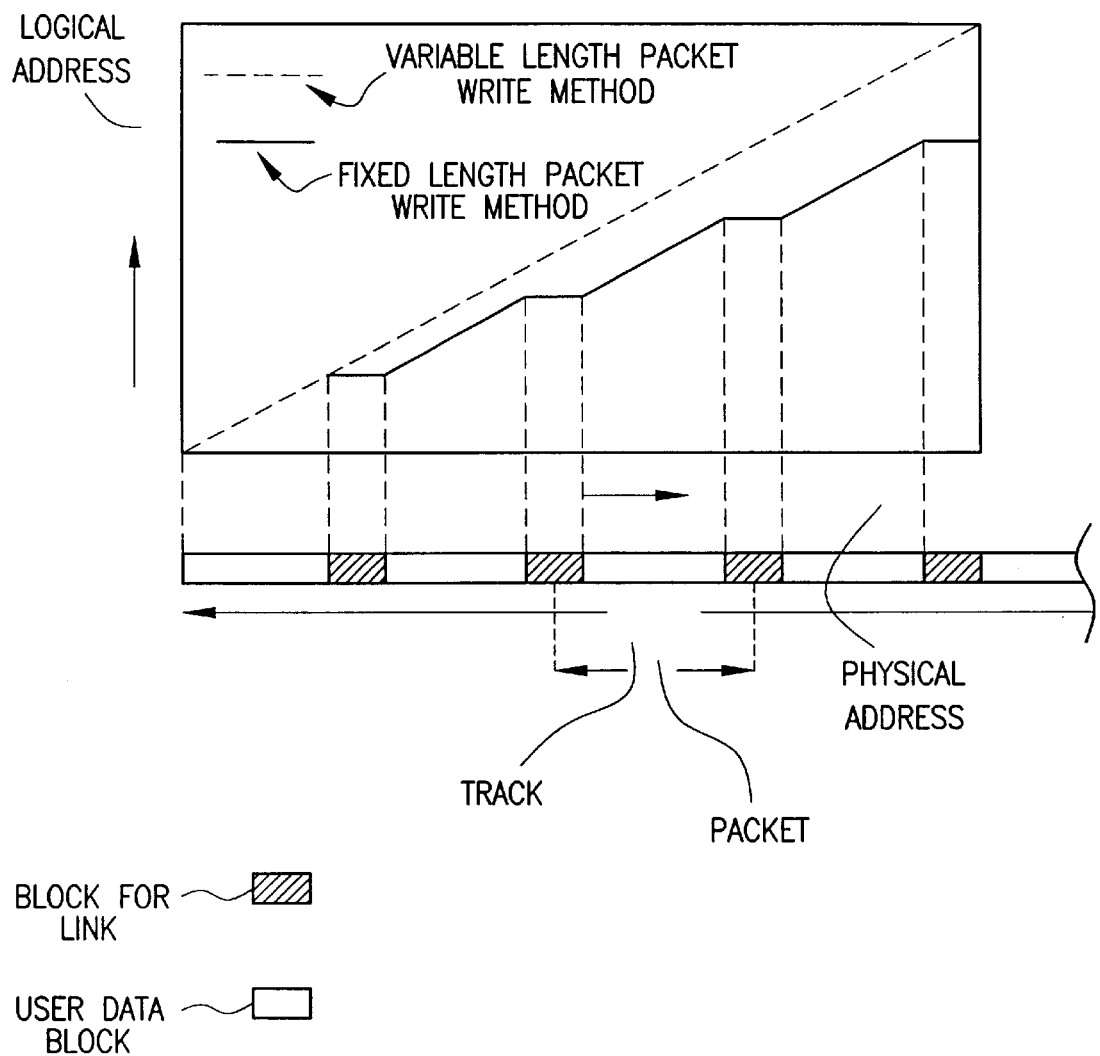
FIG. 5 shows the correlation between the address space in the fixed length Packet Write Method and the variable length Packet Write Method.

The difference between the fixed packet length Packet Write Method and the variable length Packet Write Method will be explain with reference to FIG. 5. The variable length Packet Write Method is shown by the broken line in the figure. The logical address is shown on the vertical axis and the physical address is shown on the horizontal axis. As can be seen from the figure, the logical address and the physical address of variable length Packet Write Method are linear. Since the logical address is assigned to both the user data block and the linking blocks, the logical address of the user data blocks are not assigned sequentially.

On the other hand, in the fixed length Packet Write Method, as shown a solid line in FIG. 5, the logical address is not be assigned to the linking blocks. The logical address is successively assigned to the user data block. In the fixed length Packet Write Method, there are no gaps in the logical address space. Therefore, it is possible to reproduce the information recorded on the optical disc without knowledge of the contents of the information recorded on the packet.

Figure 1:
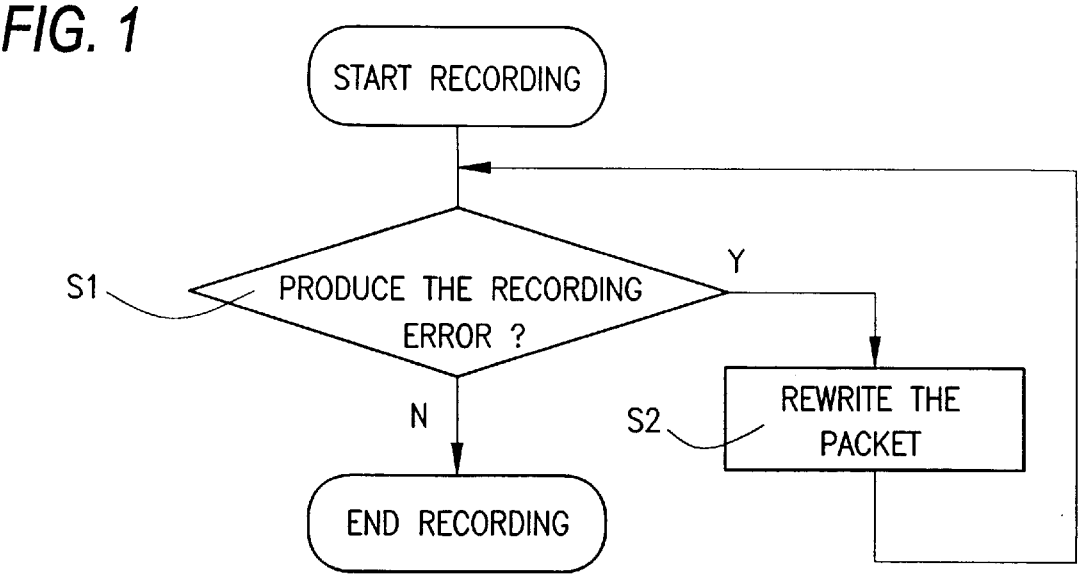
FIG. 1 is a flow chart showing the recording operation of the optical disc apparatus in accordance with one embodiment of the present invention where the recording medium is an optical disc.

The data recording operation of the optical disc recording apparatus will now be explained with reference to FIG. 1. In the recording operation of the present invention, a plurality of tracks are formed on the recording area of the optical disc 11. Each track is divided into a plurality of packets and data is recorded on each packet once. The optical disc recording apparatus determines whether a recording error is produced during the recording of the data onto the plurality of packets of the track in the step S1. If a recording error is produced, optical disc recording apparatus proceeds to the step S2 and rewrites the data onto the packet where the recording error first occurred, and returns to the step S1. If a recording error is not produced, the optical disc recording apparatus completes the data recording and finishes the operation.

Thus, when a recording error is produced during the recording of data onto the packet, the optical disc recording apparatus repeats the recording to rewrite the data for the packet until the data is successfully recording. Therefore, it is possible to record the data without additional link portions being added to the packet, and to also successfully reproduce the recorded data.

With the present invention it is possible to record data without using the non-reproducible areas of the optical disc when using the Packet Write Method. Since it is possible to record the data on the packet to where it was originally intended, it is unnecessary to change the address of the data required when the data is required to be rewritten as in the prior art.

When data is sent to be recorded onto the packet from a host computer, if an error occurs, the data must be rewritten from the host computer. This step takes much time and the system is burdened with a task of carrying out a special operation for transmitting the same data from the host computer again. According to one embodiment of the present invention, when data needs to be rewritten, the data can be accessed from the buffer 8 without the need to reaccess the host computer.

Figure 6:
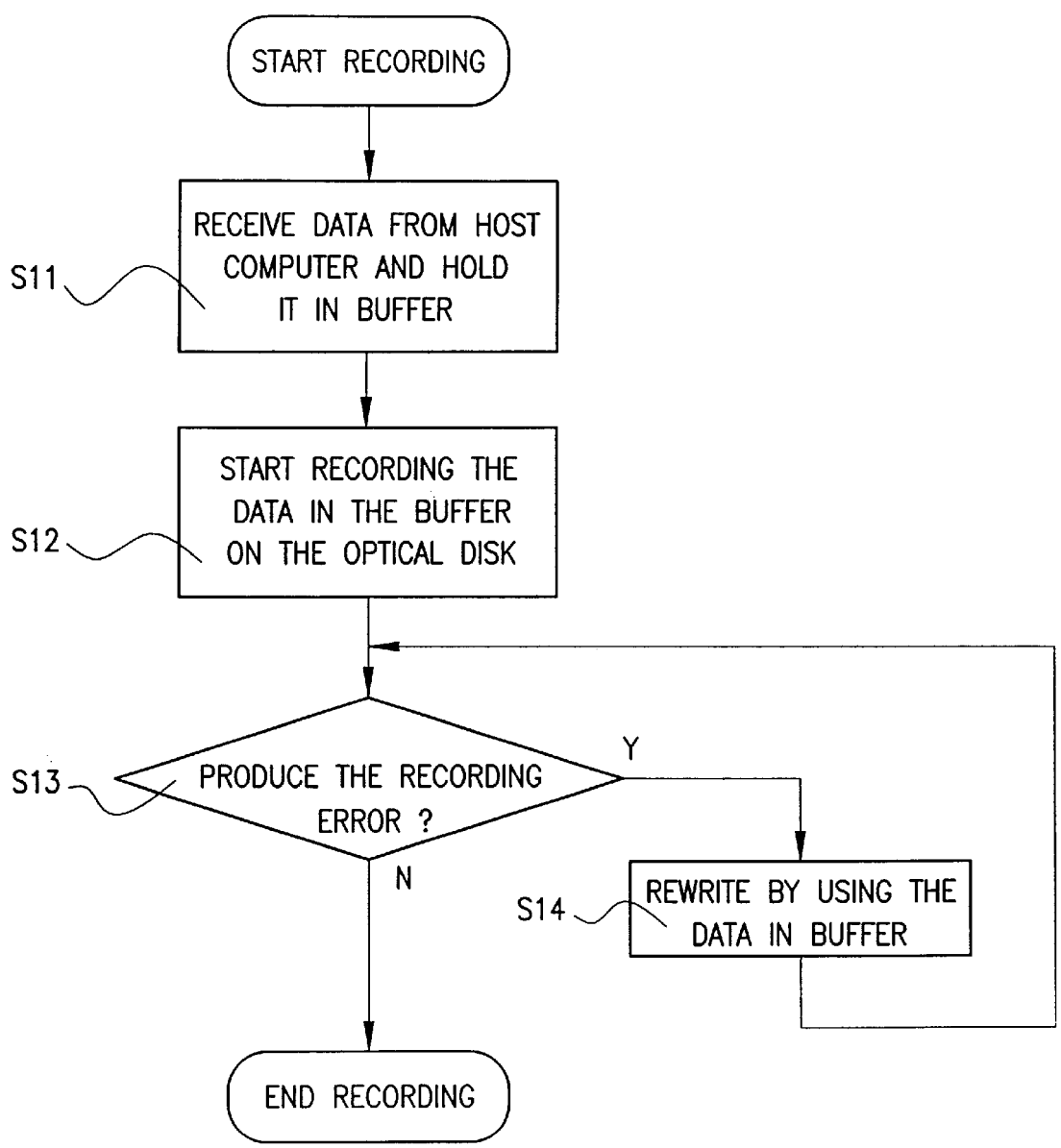
FIG. 6 is a flow chart showing the operation of one embodiment of the present invention when recording the data on the optical disc.

Reference is now made to FIG. 6. In the recording operation, a plurality of tracks are formed on the recording area of the optical disc 11, each track is divided into a plurality of packets. In the step S11, the data received from the host computer connected externally to the optical disc recording apparatus is stored into the buffer 8. In step S12, the operation to record the data that is stored in the buffer on each packet of the optical disc 11 is started. According to the flow chart, the process is advanced to the step S13, where the optical disc recording apparatus determines whether a recording error has occurred during the recording of the data onto the packet in the track of the optical disc 11. If a recording error was produced, the process advances to the step S14, where the data is rewritten onto the packet where the recording error occurred by using the data stored in the buffer 8. The process then returns to the step S13. If the recording error was not produced, the process completes the data recording and finishes the operation.

According to the present invention, it is possible to rewrite the data onto the optical disc 11 when a recording error is determined without sending the data from the host computer again. Therefore, it is unnecessary to have the special operative function in the host computer for the purpose of resending data that was not recorded on the optical disc due to a recording error.

When a recording error occurs during the recording of the data on the packet, the optical disc recording apparatus repeats the recording to rewrite the data for the packet until a successful recording of the data is achieved. Thus, it is possible to record the data without adding additional link portions to the packet to account for data being rewritten to a different location.

It is also possible to record the data without using a non-reproducing recording area of the optical disc when using the Packet Write Method. Since it is possible to record the data on the packet to the location where the data was originally intended, it is unnecessary to change the address of the data.

When recording data successively on a plurality of packets of the optical disc 11, it is necessary to record linking blocks between the packets, and record the data successively without disconnecting the servo. When a recording error occurs during successive recording, it takes substantial time to rewrite the data from the first packet. When rewriting the subsequent packet, an additional recording error may be produced. Therefore, it is undesirable to rewrite the subsequent packet.

Figure 7:
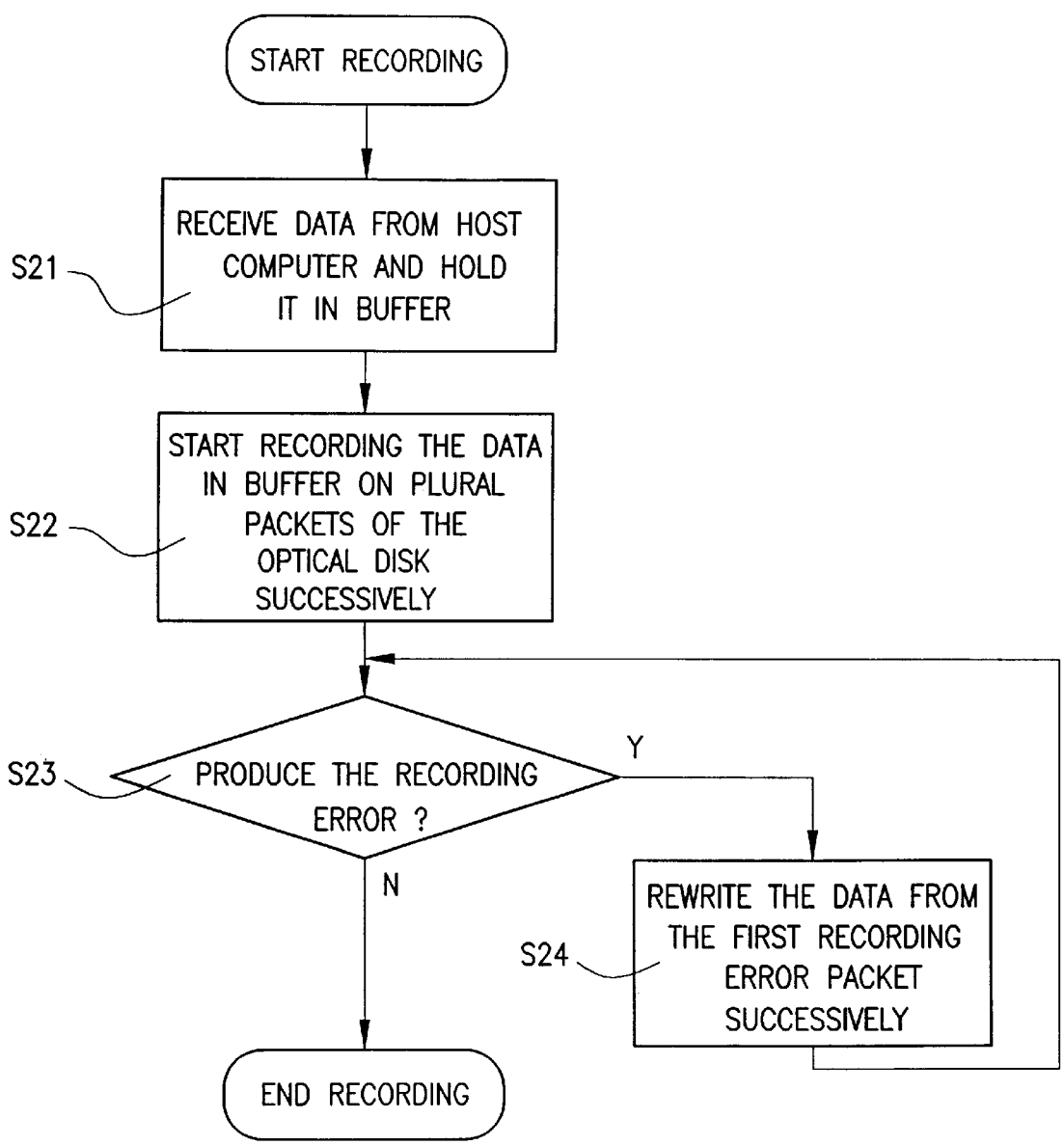
FIG. 7 is a flow chart showing the operation of a second embodiment of the present invention when recording the data on the optical disc.

Reference is now made to FIG. 7. In the recording operation, a plurality of tracks are formed on the recording area of the optical disc 11, each track is divided into a plurality of packets. In the step S21, the data received from the host computer which is connected externally to the optical disc recording apparatus is stored into the buffer 8. In step S22, the operation to successively record the data stored in the buffer onto each packet is started. At step S23, the optical disc recording apparatus determines whether a recording error occurred during the recording of data onto the packet in the track. If a recording error was produced, the optical disc recording apparatus advances to the step S24, successively rewrites the data onto the packet where the recording error occurred by using the data stored in the buffer 8. The process then returns to the step S23. If a recording error is not produced, the optical disc recording apparatus completes the data recording and finishes the operation.

Thus, when a recording error occurs during the successive recording of data on the plurality of packets, the optical disc recording apparatus rewrites the data for the packet in which the recording error occurred as well as any succeeding packets. For example, when the optical disc recording apparatus records data on ten successive packets and a recording error occurs during the recording of the fifth packet, the data is rewritten from the fifth packet through to the tenth packet.

Accordingly, the present invention prevents time loss caused by rewriting all the data when a recording error occurs. The present invention prevents new recording errors from being produced by rewriting all the data. Further, the optical disc recording apparatus of the present invention prevents deterioration of the recording area which may be caused by rewriting on the entirety of the data when a recording error is found in a single packet as the invention only rerecords the data of the error packet and the subsequent packets, but not the entire string of packets. Additionally, by rerecording the data where a recording error occurred back to the same place on the track, the present invention eliminates the need to add additional linking blocks to the data as opposed to where the data is rewritten at a different place as in the prior art.

Accordingly, it is possible to record the data without using the non-reproducing recording areas of the optical disc while using the Packet Write Method. It is also possible to record the data on the packet to where the material was to be written originally, and thus it is unnecessary to change the address of the packet. Also, when an error occurs, it is possible to rewrite the data without sending the data from the host computer again. Therefore, a special operative function in the host computer is unnecessary.

It should again be noted that the apparatus and process described above are but one embodiment that could be used. Accordingly, the above description and accompanying drawings are only illustrative of preferred embodiments which can achieve and provide the objects, features and advantages of the present invention. It is not intended that the invention be limited to the embodiments shown and described in detail herein. The invention is only limited by the spirit and scope of the following claims.

What is claimed as new and desired to be protected by Letters Patent of the United States is:

1. An optical disc apparatus comprising:
   means for forming a plurality of tracks on the recording area of an erasable optical disc;
   means for dividing each of said plurality of tracks into a plurality of packets;
   means to record data on at least one of said plurality of packets; and
   rewriting means for rewriting data on the at least one of said plurality of packets if a recording error occurs during recording of the data in said at least one packet, wherein said rewriting means rewrites the data onto the same packet where the recording error occurred.

2. The optical disc apparatus according to claim 1, wherein said means to record data on at least one of said plurality of packets records said data in a single recording step.

3. An optical disc apparatus comprising:
   means for forming a plurality of tracks on the recording area of an erasable optical disc;
   means for dividing each track into a plurality of packets;
   means to record data onto at least one of said plurality of packets;
   means for receiving data from a host computer connected externally to said optical disc apparatus;
   a buffer to hold said data; and
   rewriting means for rewriting data on the at least one of said plurality of packets if a recording error occurs during recording of the data, wherein said data for rewriting is accessed from said buffer and rewritten onto the same packet where the recording error occurred.

4. The optical disc apparatus according to claim 3, wherein said means to record data onto at least one of said plurality of packets records said data in a single recording step.

5. The optical disc apparatus according to claim 3, wherein said means for recording successively records said data onto at least one of said plurality of packets.

6. The optical disc apparatus according to claim 5, wherein said rewriting means successively rewrites said data.

7. The optical disc apparatus according to claim 6, wherein said rewriting means additionally rewrites said packets which were recorded subsequent to the packet where said recording error occurred.

8. An optical disc apparatus comprising:
   a recording head for forming a plurality of tracks on the recording area of an erasable optical disc, dividing each of said plurality of tracks into a plurality of packets and recording data on at least one of said plurality of packets;
   said recording head additionally rewrites data on the at least one of said plurality of packets if a recording error occurs during the recording of data in said at least one packet and said data is rewritten onto the same packet where the recording error occurred.

9. An optical disc apparatus comprising:
   a recording head for forming a plurality of tracks on the recording area of an erasable optical disc, dividing each of said plurality of tracks into a plurality of packets and recording data on at least one of said plurality of packets;
   a buffer to hold and receive data from a host computer connected externally to said optical disc apparatus; and
   said recording head additionally rewrites data from said buffer onto the at least one of said plurality of packets if a recording error occurs during recording of the data in said at least one packet wherein said data is rewritten onto the same packet where the recording error occurred.

10. The optical disc apparatus according to claim 9, wherein said recording head successively rewrites said data.

11. The optical disc apparatus according to claim 10, wherein said recording head additionally rewrites said packets which were recorded subsequent to the packet where said recording error occurred.

12. A method for recording data onto an erasable disc, said method comprising:
    forming a plurality of tracks on the recording area of an erasable optical disc;
    dividing each of said plurality of tracks into a plurality of packets;
    recording data on at least one of said plurality of packets; and
    rewriting data on the at least one of said plurality of packets if a recording error occurs during recording of the data in said at least one packet, wherein said data is rewritten onto the same packet where the recording error occurred.

13. The method of recording data onto an erasable disc according to claim 12, wherein said data is recorded onto at least one of said plurality of packets in a single recording step.

14. The method of recording data onto an erasable disc according to claim 12, wherein rewriting said data inlcudes successively rewriting said data.

15. The method of recording data onto an erasable disc according to claim 12, wherein said data rewritten on the at least one of said plurality of packets is accessed from a buffer.

16. The method of recording data onto an erasable disc according to claim 12, wherein said data is written using the packet at once method.

* * * * *